US012591920B1

(12) United States Patent (10) Patent No.: US 12,591,920 B1
Bhar et al. (45) Date of Patent: Mar. 31, 2026

(54) PRODUCT RECOMMENDATION BASED ON DETECTED TRENDS

(71) Applicant: Amazon Technologies, Inc., Seattle, WA (US)

(72) Inventors: Mani Bhar, Seattle, WA (US); Amy Ruschak, Seattle, WA (US); Akshit Mehta, Toronto (CA); Deep Sharma, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 18/476,012

(22) Filed: Sep. 27, 2023

(51) Int. Cl.
*G06Q 30/00* (2023.01)
*G06Q 30/0202* (2023.01)
*G06Q 30/0282* (2023.01)
*G06Q 30/0601* (2023.01)

(52) U.S. Cl.
CPC ..... *G06Q 30/0631* (2013.01); *G06Q 30/0202* (2013.01); *G06Q 30/0282* (2013.01)

(58) Field of Classification Search
CPC .................................................... G06Q 30/06
See application file for complete search history.

(56) References Cited

U.S. PATENT DOCUMENTS

| | | | |
|---|---|---|---|
| 10,776,854 B2 * | 9/2020 | Noguchi | G06Q 30/06 |
| 2020/0401976 A1 * | 12/2020 | Nelson | G06Q 30/0282 |
| 2022/0358172 A1 * | 11/2022 | Simhadri | G06F 40/237 |
| 2023/0260249 A1 * | 8/2023 | Dunay | G06Q 30/0623 |

OTHER PUBLICATIONS

Y. S. Cho, K. H. Ryu, K. S. Ryu and S. C. Moon, "Personalized u-commerce recommending service using weighted sequential pattern with time-series and FRAT method," 2014 IEEE International Conference on Management of Innovation and Technology, Singapore, 2014, pp. 295-300 (Year: 2014).*

* cited by examiner

*Primary Examiner* — Mila Airapetian
(74) *Attorney, Agent, or Firm* — Knobbe, Martens, Olson & Bear, LLP

(57) ABSTRACT

Systems and methods are provided for determining trends and products that match those trends. Trends can be identified from product information by determining product types and product attribute groupings and using time series data from a time series data service. Products can be mapped to trends by performing a textual and visual similarity matching between trends and products. A score for each product may be calculated by how many trends a product maps to in addition to user activity regarding that product. The scored products may be presented to users for purchase by trend categories or based on a general trend category.

20 Claims, 6 Drawing Sheets

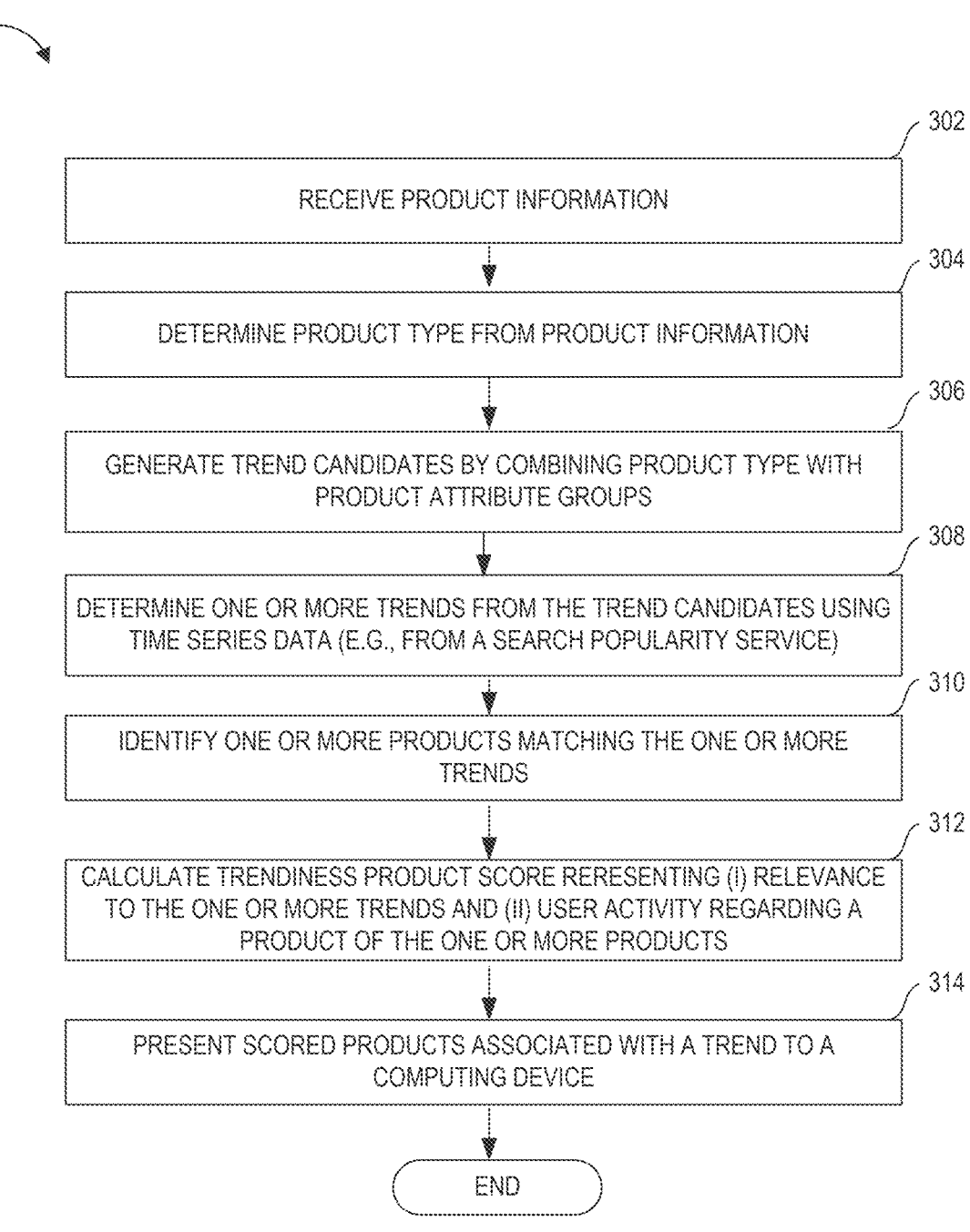

300

302

RECEIVE PRODUCT INFORMATION

304

DETERMINE PRODUCT TYPE FROM PRODUCT INFORMATION

306

GENERATE TREND CANDIDATES BY COMBINING PRODUCT TYPE WITH PRODUCT ATTRIBUTE GROUPS

308

DETERMINE ONE OR MORE TRENDS FROM THE TREND CANDIDATES USING TIME SERIES DATA (E.G., FROM A SEARCH POPULARITY SERVICE)

310

IDENTIFY ONE OR MORE PRODUCTS MATCHING THE ONE OR MORE TRENDS

312

CALCULATE TRENDINESS PRODUCT SCORE RERESENTING (I) RELEVANCE TO THE ONE OR MORE TRENDS AND (II) USER ACTIVITY REGARDING A PRODUCT OF THE ONE OR MORE PRODUCTS

314

PRESENT SCORED PRODUCTS ASSOCIATED WITH A TREND TO A COMPUTING DEVICE

END

*FIG. 3*

PRODUCT RECOMMENDATION BASED ON DETECTED TRENDS

BACKGROUND

A trend may be defined as a direction of change of popularity or acceptance of an item or idea. A fashion trend may be described as when an article of clothing (e.g., a shirt) or an accessory (e.g., a belt) has a certain threshold of popularity for a period of time. For example, certain type of leggings (e.g., faux leather leggings) may be trending (e.g., popular) for a recent, and short period of time (e.g., the last couple of months), but not trending in other periods of time (e.g., prior to the last couple of months).

BRIEF DESCRIPTION OF DRAWINGS

Embodiments of various inventive features will now be described with reference to the following drawings. The drawings are provided to illustrate example embodiments described herein and are not intended to limit the scope of the disclosure.

FIG. 3 is a flow chart depicting an illustrative routine implemented by the trending products system for receiving product information, determining one or more trends, determining scores for products based on the one or more trends, and presenting the scored products, according to some embodiments.

DETAILED DESCRIPTION

Figure 1:
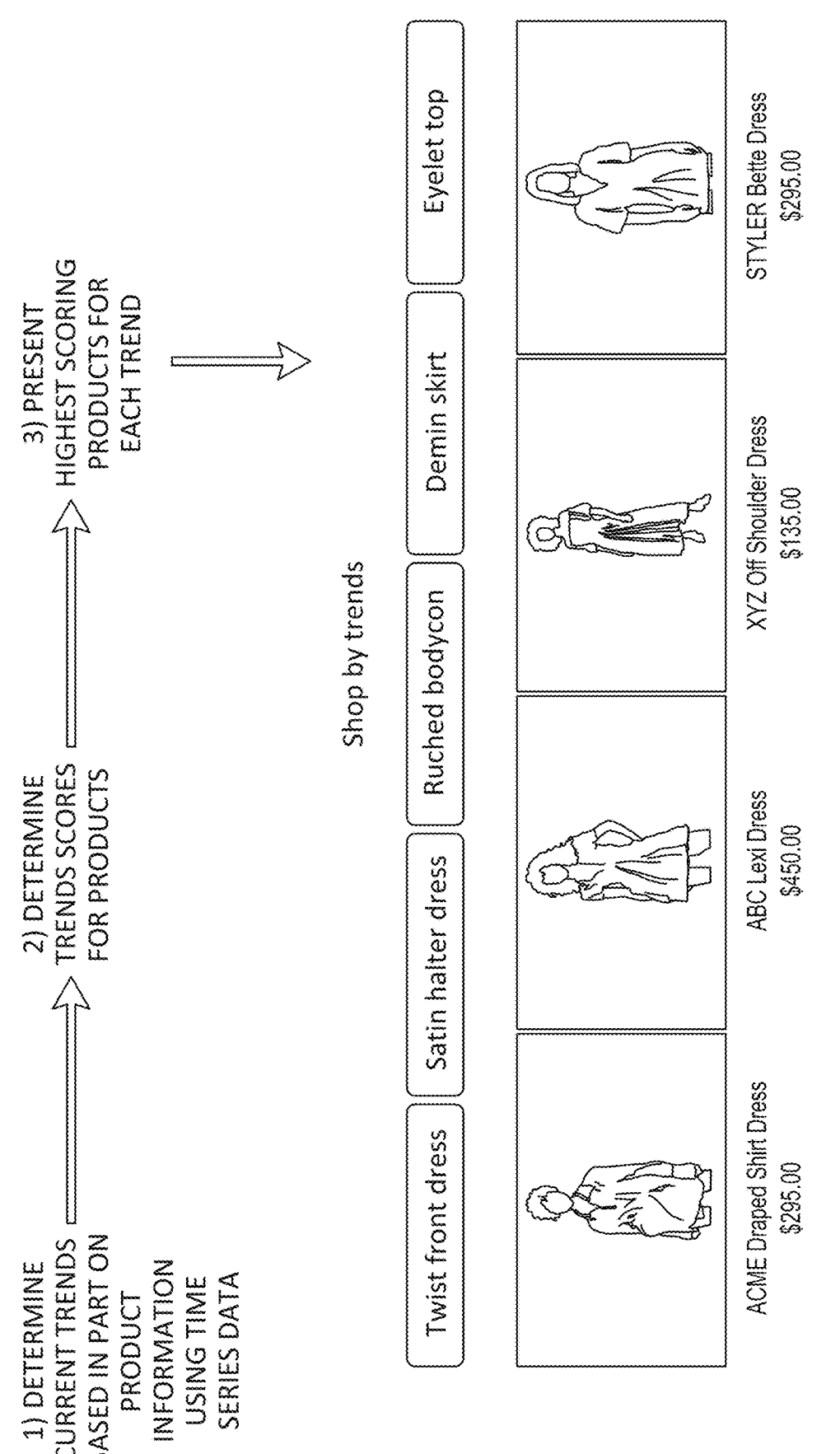
FIG. 1 is a block diagram illustrating an example high level flow of data and example visual representations during a process for determining trends from product information using time series data, determining trend scores for products based on the determined trends, and presenting the highest scored products, according to some embodiments.

Generally described, aspects of the present disclosure relate to a trending products system that can determine trends based in part on product information of products (e.g., product title or description, images of products, etc.), generate scores for products matched to a determined trend and determine whether the products are trending, and present the scored products that are trending to a computing device for presentation. Currently, fashion trends are typically determined by humans who manually research what clothing items or accessories are gaining, or have gained, in popularity. Additionally, once a fashion trend is determined manually, humans typically also manually map the manually determined fashion trends to products of an existing catalog. Moreover, as these current methods of determining fashion trends and matching products are done manually, they do not efficiently scale well and can become both time and cost prohibitive for companies (who may track fashion trends and sell products based on those fashion trends) when the size or number of fashion trends increase or become larger. For example, as the number of fashion trend categories increase (e.g., going from tracking fashion trends of only jeans to tracking fashion trends of jeans, t-shirts, and dresses) substantially more manual effort and time may be required by companies to timely determine fashion trends of the additional categories and then map those trends to products in a catalog to be offered to customers.

Furthermore, even an increase in human headcount may only lead to a diminishing return when trying to more quickly identify fashion trends and mapping those trends to products, where a fashion trend may not be identified and mapped to products in time to capitalize on such fashion trend. For example, once a fashion trend (e.g., body shaping leggings initially popularized via social media) is identified through manual effort and then manually matched to a product catalog for matching products to the trend, the fashion trend may have already passed its peak (e.g., a substantial amount of people are no longer seeking the body shaping leggings initially shown on social media) because of a limited period of time when customers are seeking to purchase products matching that trend (e.g., body shaping leggings is trending in January and no longer trending in February, and a company identifies this fashion trend in February when the trend is no longer trending).

To address at least a portion of the above-described deficiencies, a trending products system, as described herein, can implement one or more modules, components, or services to (1) determine one or more fashion trends from a received or retrieved product information (e.g., product titles, product descriptions, product images, etc.) and the strength of the such one or more trends (e.g., popularity), (2) map products from a catalog to the determined one or more fashion trends via textual and/or visual matching, (3) determine a score related to a product's relevance to a trend and/or a score related to an overall trendiness of the product (e.g., how many trends the product maps to and customer interaction associated with the trend), and (4) present or cause to present the scored products under the trend which they map to in order for customers of a company (e.g., retailer) to be able to buy products associated with the one or more trends while the trends are still trending.

In some embodiments, the trending products system can determine one or more trends using retrieved or received product information (e.g., product titles, product descriptions, product images, etc.). For example, a trend determining component may retrieve or receive product information (e.g., product title as "elastic leggings for body shaping") from a product catalog or social media source and determine a product type (e.g., leggings). In this example, the trend determining component may then identify product attributes (e.g., "body shaping", "elastic", etc.) from the product information, such as by using a language model. Furthermore, the trend determining component may then generate product attribute groupings based on the identified product attributes (e.g., "body shaping" attribute is a type of leggings) using a language model. Still in this example, the trend determining component may then generate trend candidates (e.g., phrases) based on the determined product attribute groupings (e.g., "body shaping leggings"). The trend determining component may then classify trend candidates as trends by using time series data to determine popularity of a trend candidate over a period of time, such as from a search popularity service by using the trend candidate as input to the search popularity service.

Moreover, aspects of the present disclosure enable the trending products system to take the classified trend, map products to it, provide a trend or trendiness score for the products mapped to the classified trend, and present the scored products by trend or as a trending product. For example, a scoring component may retrieve or receive the classified trend (e.g., "body shaping leggings") from the trend determining component and identify products (e.g., from a product catalog) with product information (e.g., product titles, product descriptions, product images, etc.) with textual similarity to the classified trend. Still in this example, the scoring component may then refine the set of products that match to the classified trend by performing a visual text similarity matching from the classified trend to the identified products. After this, the scoring component may perform outlier detection to further refine the products matching the classified trend by applying certain filtering criteria (e.g., not offensive, currently able to purchase in this season, etc.). Still in this example, the scoring component may then calculate a score for each product representing each product's relevance to words of the classified trend. Furthermore, the scoring component may calculate a trendiness score for each product based at least in part on how many classified trends the product maps to and/or user activity associated with that product (e.g., the number of reviews for the product, the number of page views for the product over a month, etc.).

The foregoing aspects and many of the attendant advantages of this disclosure will become more readily appreciated as the same become better understood by reference to the following description, when taken in conjunction with the accompanying drawings.

FIG. 1 is a block diagram illustrating an example high level flow of data and example visual representations during a process for determining trends from product information (e.g., product titles, product descriptions, product images, etc.), determining trend scores for products based on the determined trends, and presenting the highest scored products, which can be implemented by a trending products system described herein.

At 1) of FIG. 1, the trending products system determines trends from retrieved or received product information (e.g., product titles, product descriptions, product images, etc.) using time series data. For example, the trending products system may take product information (e.g., a product title or description such as "ABC Floral Print Twisted Front Dress") and first determine a product type (e.g., dress). In this example, the trending products system may then, using a machine learning language model (e.g., a bidirectional encoder), identify product attributes (e.g., "floral print", "twist front dress", etc.) and generate product attribute groups from the identified product attributes (e.g., "floral print" is a type of print on dresses, "twist front dress" is a type of dress, etc.). Still in this example, the trending products system may then generate trend candidates using the attribute groupings (e.g., determine that "twist front dress" is a trend candidate), such as by using the language model. Subsequently, the trending products system may classify the trend candidates as trends by using time series data (e.g., from a search popularity system, clothing retailer, social media service, that received the trend candidates as input) associated with the trend candidates to determine whether the trend candidates have gained in popularity (e.g., over a period of time, due to the current season, etc.).

At 2), the trending products system determines trend scores for products identified as mapped or matched to the classified trends. For example, the trending products system may retrieve or receive the classified trends classified at 1) and identify products in a catalog that have textual similarity (e.g., in the products' titles, descriptions, or images, etc.) to words in the classified trends (e.g., product description has "twisted dress", and classified trend is "twist front dress", where there is textual similarity). Still in this example, the trending products system may then perform a visual text similarity match between the classified trend and identified products (e.g., since the trend is "twist front dress", the trending product system searches for a twist in a front of dress in an image of a product). Still in this example, the trending products system may then perform outlier detection to further refine the products that match to the trend (e.g., filter for offensive products). Subsequently, the trending products system may then calculate a score for the remaining products regarding a particular trend (e.g., "twist front dress") by determining a product's relevance to words of the classified trend (e.g., product "ABC twisted dress" is a 70% match to the trend "twist front dress"). Additionally or alternatively, the trending products system may calculate a trendiness score for a particular product by determining how many trends the product is associated with and other factors (e.g., user activity like number of reviews, views in a month, sales of the product within a month, etc.).

At 3), the trending products system presents the highest scoring products (e.g., whether a score for that particular trend, or overall trendiness of a product across multiple trends) for each trend. For example, as shown in FIG. 1, the trending products system may present or cause to present, via a user interface (UI), different trends categories, where if a trend category is selected (e.g., "twist front dress"), the products with the highest scores (e.g., for that trend or overall trendiness) are shown. Such products may be reviewed and/or purchased via the same or a subsequently presented user interface.

Figure 2:
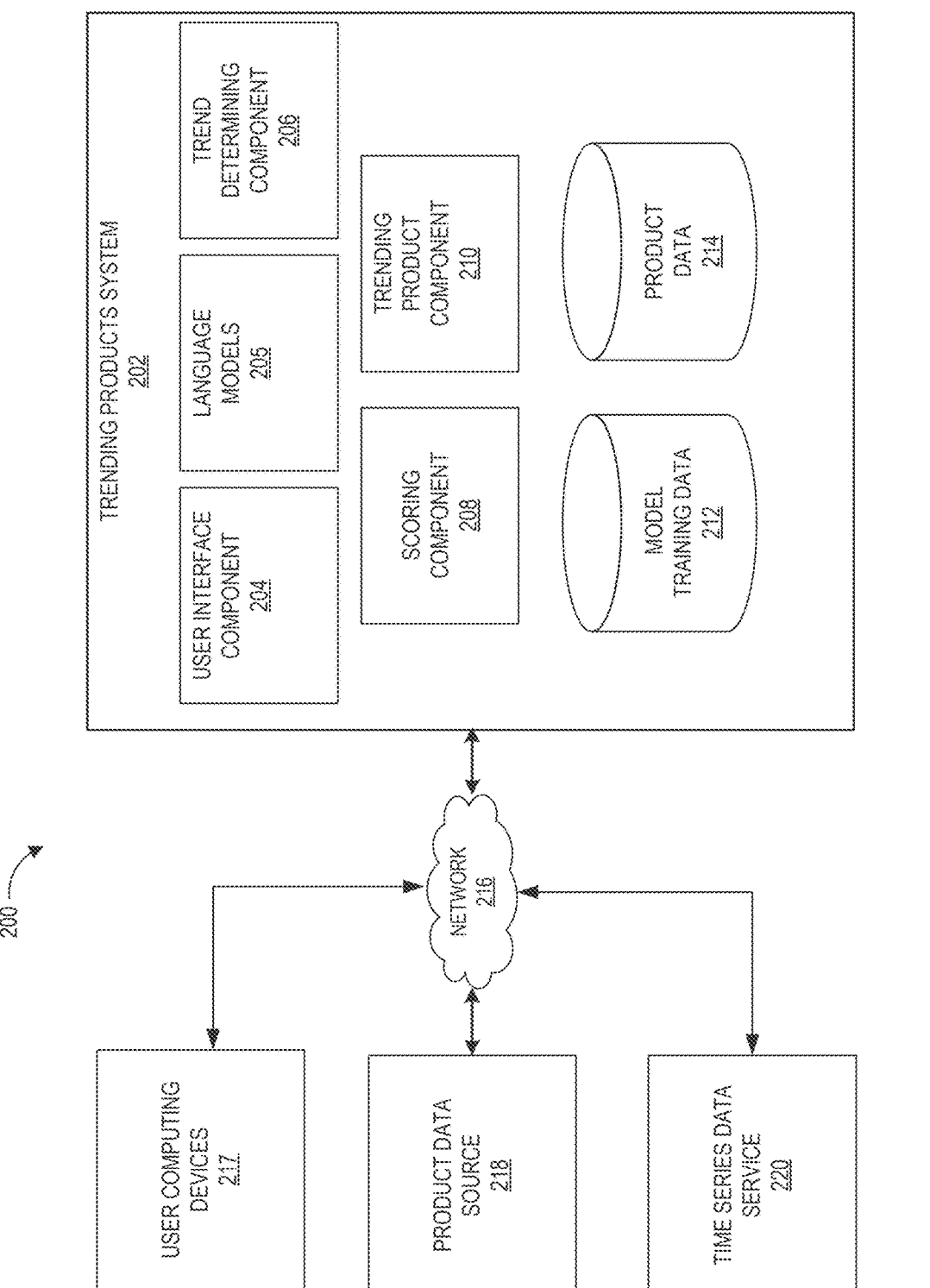
FIG. 2 depicts an example computing environment including a trending products system via which embodiments of the present disclosure can be implemented.

FIG. 2 depicts an example computing environment 200 including a trending products system 202 via which embodiments of the present disclosure can be implemented. Illustratively, the trending products system 202 can represent, but is not limited to, a network-accessible system for (i) classifying trends from product information, (ii) matching products from a product catalog to the classified trends, (iii) calculating scores regarding a product's relevance to a trend and the product's overall trendiness, and (iv) presenting or causing to present products under trends which the products were mapped to based at least on trend and trendiness scores.

The trending products system 202 can illustratively be accessed by user computing devices 217 over a network 216. The network 216 can include any appropriate network, including an intranet, the Internet, a cellular network, a local area network or any other such network or combination thereof. In FIG. 2, the network 216 is the Internet. Protocols and components for communicating via the Internet or any of the other aforementioned types of communication networks are known to those skilled in the art of computer communications and thus, need not be described in more detail herein. Moreover, aspects of the trending products system 202 may be stored or implemented locally on the user computing devices 217 and used without the network 216.

The user computing devices 217 can include any network-equipped computing device, for example desktop computers, laptops, smartphones, tablets, e-readers, set top boxes, virtual reality headsets, gaming consoles, and the like. The user computing devices 217 can illustratively include a user interface component (not shown) for accessing the trending products system 202. In one embodiment, the interface user component represents or is provided by an application executing on the user computing devices 217, such as a native application provided by an operator of the trending products system 202 or a web browser application (e.g., rendering a web page provided by the trending products system 202).

As noted above, the trending products system 202 can classify trends from product titles or descriptions, match and score products to the classified trends, and present the products that match a trend ordered by scores. The trending products system 202 illustratively includes a user interface (UI) component 204, language models 205, trend determining component 206, scoring component 208, trending product component 210, model training data 212, and product data 214.

The trending products system 202 can utilize the UI component 204 to provide a user of the user computing devices 217 abilities to at least access various functionality associated with the trending products system 202. For example, the UI component 204 may allow the user to see trends as icons (e.g., icon for "twist front dress", "satin halter dress", "ruched bodycon", etc.) whereupon selecting or clicking the icon, the user may see products that are mapped or matched to that trend (e.g., products that are mapped to the trend above a certain trend score or trendiness score). For example, the UI component 204 may allow the user to see products that have been determined to be trending (e.g., based on each product's trend or trendiness score being above a certain threshold and also optionally taking into account the user's preferences and prior purchases).

The trending products system 202 can utilize the language models 205 to classify trends and determine trending products. For example, the language models 205 may include machine learning models which can be used for language or image processing. The language models used by the trending products system 202 may be deep learning models, such as any derivative of a Bidirectional Encoder Representations from Transformers (BERT) (e.g., sentence BERT (SBERT), and Contextualized Late Interaction over BERT (Col-BERT)), masked language models, and/or others. Moreover, the language models used by the trending products system 202 may be any derivative of computer vision machine learning models such as ones that utilize Contrastive Language-Image Pre-Training (CLIP) architecture.

The trending products system 202 can utilize the trend determining component 206 to classify trends from product titles or descriptions. For example, and as explained in more detail below, the trend determining component 206 may use language models to determine trend candidates by identifying product attributes within a product title or description and generate product attribute groupings based on the product attributes. Furthermore, the trend determining component 206 may then submit or input the trend candidates to a time series data service 220 (explained in more detail below) and retrieve or receive time series data regarding popularity of each trend candidate. After receiving the time series data for each trend candidate, the trend determining component 206 may analyze the time series data for each trend candidate and determine if the trend candidate is a trend (e.g., the times series data for the trend candidate indicates that search popularity for the trend candidate has been increasing for the last two months or other relevant time period).

The trending products system 202 can utilize the scoring component 208 to calculate a trend score regarding a particular trend for products and a trendiness score for a particular product. For example, and as explained in more detail below, the scoring component 208 may utilize the classified trend from the trend determining component 206 to identify products that match the trend using textual similarity methods and visual text similarity methods using language models. The scoring component 208 may then calculate a trend score for each matched product representing each product's relevance to classified trend words. Additionally or alternatively, the scoring component 208 may calculate a trendiness score for each product matched to one or more trends by determining the number of trends a product maps to (e.g., product maps to the trends "ruched dress" and "twist dress") and also user activity associated with that product (e.g., number of reviews for the product, number of page views in a period of time for the product, number of the products sold in a period of time, etc.).

The trending products system 202 can utilize the trending product component 210 to determine whether a product should be identified as a trending product for a particular trend. For example, the trending product component 210 may identify a product as a trending product under a trend if a certain threshold score is met or surpassed (e.g., product "ABC wrinkled dress" is identified as a product trending under the trend "ruched dresses" because the trend score for "ABC wrinkled dress" under the trend "ruched dresses" is above a score of 80). As another example, the trending product component 210 may identify a product as trending if the product's trendiness score is above a certain threshold (e.g., the product "ABC wrinkled dress" is identified as trending under more than two trends and has over a thousand views on a retail website over the past month).

The trending products system 202 may further train machine learning (ML) models (e.g., language models 205) using the model training data 212. ML models as described in this disclosure may be any ML model related to, or a part of, any one of the UI component 204, language models 205, trend determining component 206, scoring component 208, or trending product component 210. For example, the model training data 212 may include training data regarding what word or group of words should be associated with each other or clustered together in relation to clothing products (e.g., "satin" and "silk" are similar and should be matched, "shiny" and "metallic" are similar and should be matched, etc.), which may additionally or alternatively be represented or reflected in a learned embedding space. As another example, the model training data 212 may include association data indicating trend words that can map to product titles or descriptions (e.g., training data maps trend "ruched dress" to a product title or description with words and synonyms like "ruffled dress", "textured dress", "rouch dress", "scalloped dress", "dress with petals", etc.).

Still referring to FIG. 2, the trending products system 202 can further include product data 214 to store existing product data and their associated product titles and descriptions, such that the trending products system 202 can map existing products to classified trends by at least retrieving or receiving product data from the product data 214. For example, the scoring component 208 may retrieve or receive product details (e.g., product title, description, images of the products, etc.) from the product data 214 to match against classified trends from the trend determining component 206. It should be noted that the product data 214 may be stored in another system connected to the trending products system

202 and that the product data 214 does not need to necessarily reside in the trending products system 202 (e.g., via the network 216).

The example computing environment 200 further includes product data source 218 that can provide or send to the trending products system 202, product titles or descriptions, such that the trending products system 202 may determine if such product titles or descriptions contain words or phrases that are trends. The product data source 218 may be connected to the trending products system 202 via the network 216. For example, the product data source 218 may be a social media site which may contain images or key words that may be associated with products that can be evaluated to determine if they are trends by the trending products system 202. As another example, the product data source 218 may be a clothing website with clothing advertised to be in trend, which may contain images or key words that may be associated with products that can be evaluated to determine if they are trends by the trending products system 202. As another example, the product data source 218 may be a clothing retailer system which may contain images or key words that may be associated with products that can be evaluated to determine if they are trends by the trending products system 202. As another example, the product data source 218 may be a wholesale retailer system (e.g., associated with a retailer that sells different types of products or services, including clothing products) which may contain images or key words that may be associated with products that can be evaluated to determine if they are trends by the trending products system 202. As another example, the product data source 218 may be a news outlet (e.g., or other news source), or style or culture magazine, which may contain images or key words that may be associated with products that can be evaluated to determine if they are trends by the trending products system 202.

The example computing environment 200 further includes time series data service 220 that can be a service which records and optionally analyzes popularity of trends across various regions and languages. For example, the time series data service 220 may track the popularity of various (i) search terms submitted by users to a general-purpose Internet search engine (e.g., the time series data service may be considered a search popularity service), (ii) popularity of a product on social media, or (iii) popularity of a product on a retailer's website, among other things. The trending products system 202 may be provided time series data regarding search words/phrases (e.g., provides time series data for "spaghetti strap dress"), or images of products, where the time series data may show, but not be limited to, popularity (e.g., as linear growth on a line graph with time periods and search activity) of a search word/phrase, or product image, over a period of time (e.g., time series data showing that the search word or phrase "spaghetti strap dress" has increased in popularity from the year 2020 to 2022 but has decreased in popularity in 2023). Moreover, the time series data may show seasonal effects (e.g., effects on searches in the winter, fall, spring, summer, etc.) or holiday effects (e.g., effects on searches during certain holidays such as Christmas). The time series data service 220 may be connected to the trending products system 202 via the network 216. As described herein, the trending products system 202 may submit or input trend candidates to the time series data service 220 and receive time series data regarding those trend candidates to determine whether those trend candidates are actual trends.

The trending products system 202 is depicted in FIG. 2 as operating in a distributed computing environment including several computer systems that are interconnected using one or more computer networks (not shown in FIG. 2). The trending products system 202 can alternatively operate within a computing environment having a fewer or greater number of devices than are illustrated in FIG. 2. Thus, the depiction of the trending products system 202 in FIG. 2 should be taken as illustrative and not limiting to the present disclosure. For example, the trending products system 202 or various constituents thereof could implement various Web services components, hosted or "cloud" computing environments, and/or peer to peer network configurations to implement at least a portion of the processes described herein. Moreover, the environment 200 may include additional elements not shown in FIG. 2.

Further, the trending products system 202 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a cloud computing environment.

FIG. 3 is a flow chart depicting an illustrative routine 300 implemented by the trending products system 202 for receiving product information, determining one or more trends, determining scores for products based on the one or more trends, and presenting the scored products, according to some embodiments. The routine 300 begins at block 302, where the trending products system 202 receives or retrieves product information (e.g., product titles, product descriptions, product images, etc.). As described herein, the trending products system 202 may receive or retrieve the product information from the product data source 218 (e.g., from a product catalog of a clothing retailer).

At 304, the trending products system 202 or the trend determining component 206 determines a product type from the product information. For example, if the product title or description is "ACME blue rouched bodycon dress," the trending products system 202 or the trend determining component 206 may determine that the product type is that of a dress (e.g., product type may also be determined by examining an image of a product and determining that it is a dress). In this example, the trending products system 202 or the trend determining component 206 may leave other words or phrases of the product title or description to be analyzed as attributes associated with the product type.

At 306, the trending products system 202 or the trend determining component 206 generates trend candidates by combining the product type with determined product attribute groups. For example, the trending products system 202 or the trend determining component 206 may use a language model or a computer vision model to first identify product attributes from product information (e.g., "blue", "rouched", "bodycon," images of a product, etc.) and then identify product attribute groupings for each of the product attributes (e.g., product attribute grouping of color that is "blue"). Subsequently, the trending products system 202 or the trend determining component 206 may combine some or all of the product attribute groupings (e.g., or words or phrases similar to the values of the product attribute groupings such as using "ruffle" instead of "rouch" or "rouched") with the product type to create trend candidates (e.g., "blue rouched dress", "rouched bodycon dress", "rouch dress", "ruffled dress", etc.).

At 308, the trending products system 202 or the trend determining component 206 may use time series data, from the time series data service 220, to determine if any of the trend candidates are trends. For example, the trending products system 202 or the trend determining component 206 may submit or input the trend candidates to the time series data service 220 for time series data related to the trend candidates. The trending products system 202 or the trend determining component 206 may evaluate, for each trend candidate, the popularity (e.g., over a period of time) of the trend candidate, and if the popularity is above a certain threshold (e.g., if a search term has increased 50% in search volume over the past six months, it meets or exceeds the threshold) then the trend determining component 206 may classify a trend candidate as a trend.

At 310, the trending products system 202 or the scoring component 208 identifies one or more products that match the one or more classified trends from 308. For example, the scoring component 208, using language models, may perform textual similarity matching (e.g., whether the text of the classified trend matches the text of a product title or description from a product catalog) to match products from a product catalog to the classified trend. As another example, the scoring component 208, using language or computer vision models, may perform a visual text similarity matching (e.g., whether the text of the classified trend matches parts of an image of a product [trend includes "one shoulder dress" and image of product should show one shoulder dresses and not two shoulder dresses] or whether a product's description accurately matches to an image of the product [product title includes "one shoulder dress" and image of product should show a one shoulder dress and not a two shoulder dress]) to match products from a product catalog to the classified trend.

At 312, the trending products system 202 or the scoring component 208 calculates a trendiness score for each of the products identified as a match for the one or more trends from 310. For example, the trendiness score may be based on or reflect features of trends a product is associated with (e.g., the number of trends associated with a product and the popularity of the associated trends) and features or metrics associated with the product itself (e.g., sales of the product for a given month, ratings of the product, etc.). It will be appreciated that when calculating the trendiness score, various weights may be applied to the individual trends (e.g., based on strength or popularity of the trend) and importance of individual product features and/or activity metrics, depending on the embodiment.

At 314, the trending products system 202 or the trending product component 210 presents or causes to present the scored products to a computing device. For example, the computing device may belong to a shopper of a clothing retailer, where the products in trend are shown via a UI on the computing device. In this example, the trending products system 202 or the trending product component 210 may present the products with the highest trendiness scores as products that are trending without trend categories (e.g., under a "trending now" section) or may present the products with the highest trendiness scores under trend categories where those products rate the highest (e.g., under a trend category of "twist front dress" or "satin halter dress"). While FIG. 3 is described with reference to operation of the trending products system 202, in some embodiments the routine 300 may be implemented in whole or in part by another device, such as the user computing devices 217.

Figure 4A:
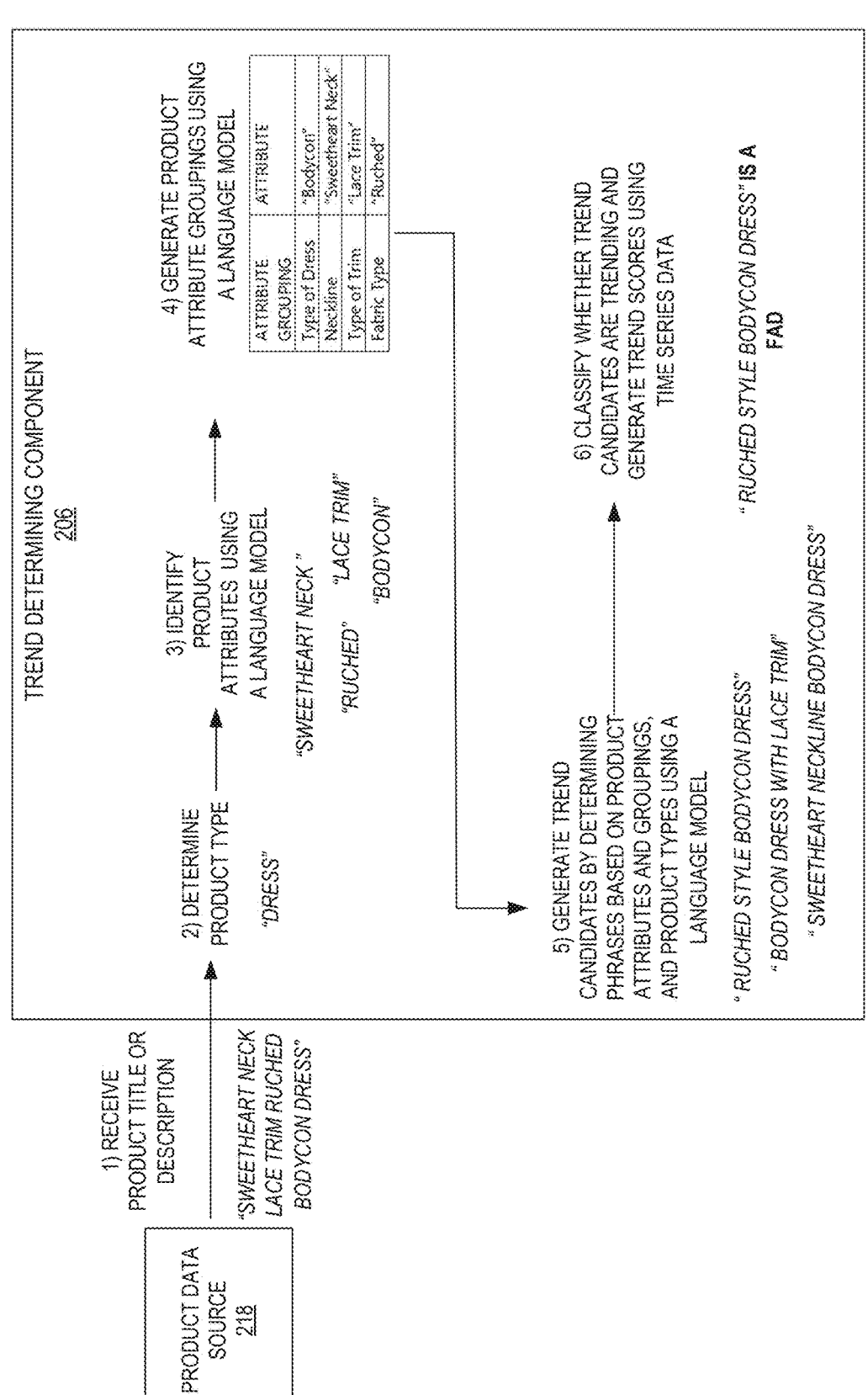
FIG. 4A is a block diagram depicting illustrative interactions for determining one or more trends based on product information, in accordance with embodiments of the present disclosure.

With reference to FIG. 4A, illustrative interactions will be described for determining one or more trends based on a received product information, in accordance with embodiments of the present disclosure.

The interactions begin at (1), where the trend determining component 206 receives or retrieves product information (e.g., product titles, product descriptions, product images, etc.) from the product data source 218. As described herein, the product data source 218 may be website which shows or surfaces products that may be currently trending (e.g., social media website), which the trend determining component 206 may evaluate for trendiness. In some embodiments, the product information may be retrieved from a product catalog of a retail service operated by the same entity that operates the trending products system 202, while in other embodiments the product information may be received, retrieved or parsed from an external service, website, application programming interface (API) or database. While one product is depicted in FIG. 4A, it will be appreciated that the process shown in FIG. 4A may be performed with respect to each of potentially thousands of different products to determine one or more trends.

At 2), the trend determining component 206 determines a product type from the received or retrieved product information. For example, the trend determining component 206 may use an unsupervised language model (e.g., SBERT) to find a similarity between one or more words within the product title and a type of product (e.g., determine a product type of dress from a product title of "sweetheart neck lace trim ruched bodycon dress").

At 3), the trend determining component 206 identifies product attributes from the product information using a language model. For example, the trend determining component 206 may use an unsupervised language model (e.g., SBERT) to identify or generate product attribute from the product information (e.g., product title or description) by clustering (e.g., using a density-based clustering algorithm (DBSCAN)) words of the product information together that have trained or pre-trained associations from training data (e.g., cluster together "sweetheart neck", "lace trim", "ruched", "bodycon").

At 4), the trend determining component 206 generates product attribute groupings from the product attributes using a language model. For example, the trend determining component 206 may use an unsupervised language model (e.g., SBERT) to generate product attribute groupings from the product attributes by clustering (e.g., using DBSCAN) words of the products attributes to attribute groupings that have trained or pre-trained associations from training data (e.g., "sweetheart neck" as a neckline, "lace trim" as a type of trim, "ruched" as a fabric type, "bodycon" as a type of dress).

At 5), the trend determining component 206 generates trend candidates by determining phrases based on the product attributes, product attribute groupings, and the product type. For example, the trend determining component 206 may use an unsupervised language model (e.g., SBERT) to generate trend candidates by combining product attributes (e.g., based on product attribute groupings) and the product type by clustering (e.g., using DBSCAN) words of the products attributes to the product type that have trained or pre-trained associations from training data (e.g., "ruched style bodycon dress", "bodycon dress with lace trim", "sweetheart neckline bodycon dress", etc.).

At 6), the trend determining component 206 classifies whether the trend candidates from 5) are trends using time series data. For example, the trend determining component 206 may submit or input to the time series data service 220 a trend candidate (e.g., "ruched style bodycon dress") and be given back time series data related to that trend candidate. As described herein, the time series data may represent the popularity of the trend candidate over a period of time (e.g., years, months, weeks, days, etc.). In this example, the popularity of the trend candidate may be represented as showing linear growth or decline (e.g., in a line graph with search volume, seasonal components, and/or holiday components represented on a y axis and a period of time represented on an x axis) of the trend candidate. Still in this example, a trend may be identified in the time series data for the trend candidate when change points of the time series data indicate a new trend (e.g., no growth of popularity in the last five years but steady growth of popularity within the last year). Still in this example, a trend may be identified in the time series data for the trend candidate when a slope of a linear growth term associated with the time series data indicates long term growth (e.g., consistent and steady growth in popularity during the last five years). Still in this example, a trend may be identified in the time series data for the trend candidate when a seasonal component indicates a change in popularity (e.g., steady spike in Christmas stockings search popularity a few days before Christmas). In some instances, seasonal adjustments may be employed to downgrade or lower the trend indication that may appear to otherwise indicate a trend (e.g., a certain style of parka appears to be trending at the start of winter when compared to recent months, but that trend candidate has seen similar season-related popularity increases in past winters).

Still at 6), the trend determining component 206 may utilize the time series data to determine a popularity score of the trend candidate (e.g., 1 being the highest score for popularity and 0.5 being the middle score for popularity). For example, the trend determining component 206 may give the trend candidate a higher score based on the period of time of when popularity of the search term started gaining popularity (e.g., give a popularity score of 0.6 for steady growth in popularity for the last six months but a popularity score of 0.4 if there was steady growth in popularity a year ago but no growth currently). The trend determining component 206 may take the popularity score associated with the trend candidate and determine if the trend candidate meets a certain threshold (e.g., popularity score over 0.6). Moreover, the trend determining component 206 may determine a type of trend a trend candidate is by using the time series data (e.g., trend is a fad if popularity is only for weeks or months, trend is a micro trend if popularity is for one or two years, trend is a macro trend if popularity is for five or more years, etc.). Therefore, the trend determining component 206 may determine a type of trend a trend candidate is after classifying the trend candidate as a trend (e.g., "ruched style bodycon dress" is a fad).

Figure 4B:
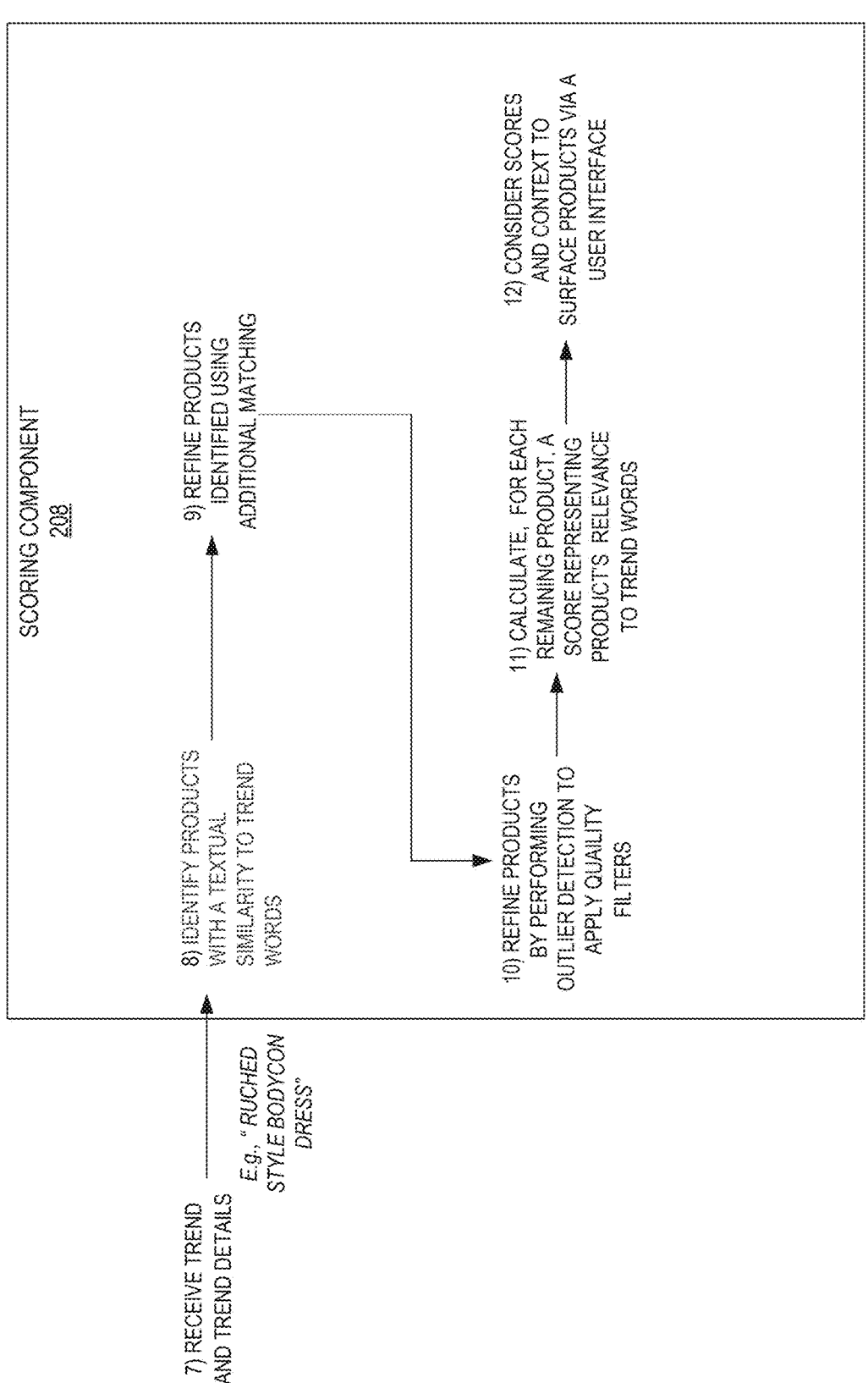
FIG. 4B is a block diagram depicting illustrative interactions for utilizing the determined one or more trends from FIG. 4A to calculate a score representing a product's relevance to words of the one or more trends, in accordance with embodiments of the present disclosure.

With reference to FIG. 4B, illustrative interactions will be described for utilizing the classified one or more trends from FIG. 4A to calculate a score representing a product's relevance to words of the one or more trends, in accordance with embodiments of the present disclosure. The interactions begin at 7), where the scoring component 208 retrieves or receives a classified trend from the trend determining component 206 (e.g., "ruched style bodycon dress" as a fad).

At 8), the scoring component 208 identifies products with a textual similarity to the classified trend. For example, the scoring component 208 may retrieve products from the product data 214 and use a language model (e.g., SBERT) to identify products that have a product title or description with a textual similarity to the trend (e.g., look for all products with "ruch", "ruhed", "dress", "dresses" or any derivatives).

At 9), the scoring component 208 refines the identified products at 8). For example, the scoring component 208 may refine the identified products by using a language model (e.g., ColBERT) to perform token level attention matching between the trend and the identified products (e.g., look for products with "ruched" and "dress" together in a title). Furthermore, the scoring component 208 may further refine the identified products at 8) by performing a visual text similarity match between the refined products and the trend. For example, the scoring component 208 may further refine the identified products by using a language or computer vision model (e.g., CLIP) to perform a visual text similarity between the trend and an image of a product (e.g., since the trend is for a "ruched style bodycon dress", the scoring component 208 searches for a ruched design in a dress in an image of a product) or a visual text similarity between the product title of the product and an image of the product (e.g., since the product title contains "ruched" and "dress", the scoring component 208 searches for a ruched design in a dress in an image of a product).

At 10), the scoring component 208 further refines the identified products at 9) by performing outlier detection applying quality filters. For example, the scoring component 208 may apply quality filters to not match products that don't meet certain sales criteria (e.g., less than 1,000 units sold in the last month). As another example, the scoring component 208 may apply quality filters to not match products that are offensive (e.g., products associated with conspiracy theories, hate groups, profanity, etc.). As another example, the scoring component 208 may apply a quality filter to not match products that are in a do not match list (e.g., blacklist).

At 11), the scoring component 208 calculates a score representing product relevance to the trend for each remaining product from 10). For example, the scoring component 208 may calculate a score of how relevant a product is to a trend by combining the textual similarity matching and the visual text similarity matching of each product to the trend (e.g., there is 70% textual similarity of a product "ruch style dress" to the trend "ruched style bodycon dress" and a visual textual similarity match confirms that an image of the product "ruch style dress" indeed has a ruched style on a dress).

Additionally or alternatively, the scoring component 208 may calculate a trendiness score may be calculated for each product. For example, the trendiness score may be based on the trends a product is associated with (e.g., how many trends is the product associated with and the popularity score of each associated trend). As another example, the trendiness score may be based on user activity associated with the product (e.g., units of the product sold over a month or other period of time, views of the product over that period of time, average or mean ratings of the product, and/or the number of reviews the product has). The scoring component 208 may combine a weighted sum of the score based on the trends and the score based on user activity to result in the trendiness score.

At 12), the scoring component 208 may provide the scores to another component of the trending products system 202 (such as the user interface component 204) to consider the scores and context information (e.g., a particular page or context in which products may be presented) to surface products associated with those scores via a user interface (UI). For example, the scoring component 208 may input a trendiness score of a product into the trending product component 210 so that the trending product component 210 may determine how to surface the product based at least in part on the score (e.g., if the score meets a certain threshold then show the product in a "trending now" category) and the context (e.g., if products are to be presented on a search results page, may present only trending products relevant to a search term entered by a user viewing the page).

Figure 5:
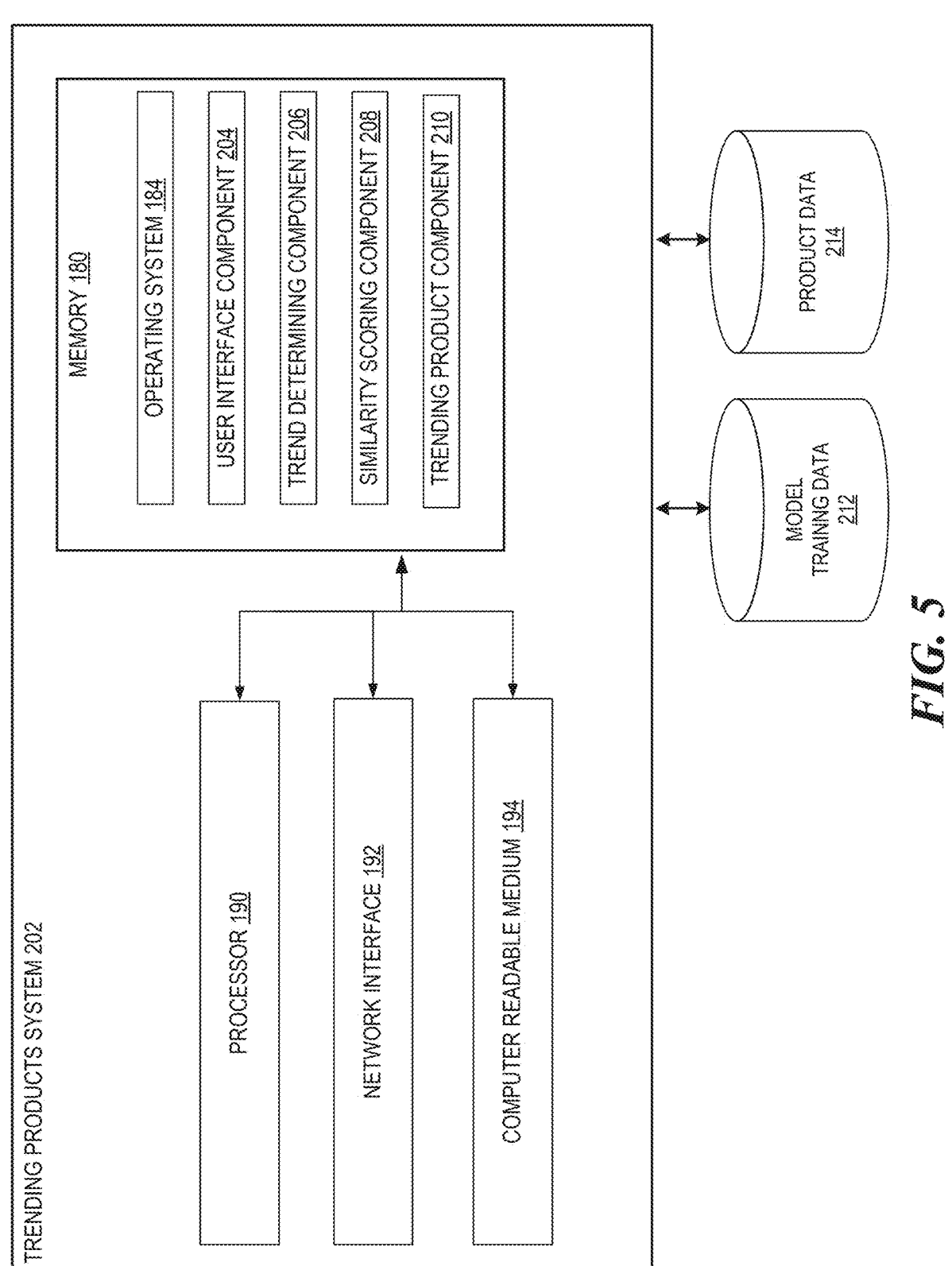
FIG. 5 is a block diagram depicting an illustrative architecture for a computing system that may implement one or more of the features described herein.

FIG. 5 depicts an example architecture of a computing system (referred to as the trending products system 202) that can be used to perform one or more of the techniques described herein or illustrated in FIGS. 1, 2, 3, 4A, and 4B. The general architecture of the system 202 depicted in FIG. 5 includes an arrangement of computer hardware and software modules that may be used to implement one or more aspects of the present disclosure. The trending products system 202 may include many more (or fewer) elements than those shown in FIG. 5. It is not necessary, however, that all of these elements be shown in order to provide an enabling disclosure. As illustrated, the trending products system 202 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 216 illustrated in FIG. 2.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer readable media. The memory 180 may store an operating system 184 that provides computer program instructions for use by the processor 190 in the general administration and operation of the trending products system 202. The memory 180 may further include computer program instructions and other information for implementing one or more aspects of the present disclosure. For example, in one embodiment, the memory 180 includes the UI component 204 that generates user interfaces (and/or instructions therefor) for display upon a user computing device, e.g., via a navigation and/or browsing interface such as a browser or application installed on the user computing device.

In addition to and/or in combination with the UI component 204, the memory 180 includes a trend determining component 206, scoring component 208, and trending product component 210. In one embodiment, the trending products system 202 when executed implements various aspects of the present disclosure, e.g., determining a trend and products that map to the trend, and/or other aspects discussed herein or illustrated in FIGS. 1, 2, 3, 4A, and 4B. Illustratively, the trending products system 202 may include code corresponding to the UI component 204, trend determining component 206, scoring component 208, and trending product component 210.

While the UI component 204, trend determining component 206, scoring component 208, and trending product component 210 are shown in FIG. 5 as part of the trending products system 202, in other embodiments, all or a portion of these components or modules may be implemented by another computing device. For example, in certain embodiments of the present disclosure, another computing device in communication with trending products system 202 may include several modules or components that operate similarly to the modules and components illustrated as part of the trending products system 202. In some instances, these components may be implemented as one or more virtualized computing devices. Moreover, components may be implemented in whole or part as a distributed computing system including a collection of devices that collectively implement the functions discussed herein.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

a memory configured to store specific computer-executable instructions; and a processor in communication with the memory and configured to execute the specific computer-executable instructions to at least:

receive a product title or description of a product;

determine, via an unsupervised language model, a product type of the product based at least in part on similarity between words within the product title or description and the product type;

group, via the unsupervised language model, product attribute groupings from the product title by clustering certain words of the product title or description that are determined to be associated with a feature of the determined product type, wherein clustering words of the product title or description is based at least in part on representations of words of the product title or description in a learned embedding space;

generate trend candidates by at least combining, for an individual trend candidate of the trend candidates, a product attribute grouping of the product attribute groupings with the determined product type as a phrase for the individual trend candidate;

determine, using a search popularity service, one or more trends, wherein the one or more trends are determined by the specific computer-executable instructions being configured to at least:

submit the trend candidates to the search popularity service;

receive time series data for each of the trend candidates in response to submitting the trend candidates, wherein time series data for an individual trend candidate comprises information regarding search popularity, over a period of time, of at least one of (a) the individual trend candidate or (b) a phrase that has been associated with the individual trend candidate by the search popularity service;

classify a trend candidate as a trend by determining that the trend candidate increased in popularity over the period of time;

perform token level attention matching between the one or more trends and a plurality of products, wherein the token level attention matching identifies, based on a first token, a second token that scores above a threshold in probability of matching with the first token;

identify one or more products that match the one or more trends by at least identifying textual similarity between one or more words of a title of each of the one or more products and words within at least one of the one or more trends using the token level attention matching;

calculate, for each product of the identified one or more products, a score representing a combination of (1) relevance of the product to words within the trend and (2) user activity, wherein the user activity comprises of information regarding (i) sales over a period of time, (ii) customer ratings, or (iii) number of views over a period of time of the product; and present information regarding at least one product of the identified one or more products to a computing device based at least in part on the score of each of the identified one or more products.

2. The system of claim 1, wherein the product title and description are retrieved from a product catalog of a retailer, wherein the identified one or more products are presented via a user interface that enables a user to select a product from the product catalog for purchase.

3. The system of claim 1, wherein the unsupervised language model has been trained to learn associations of words regarding product titles or product descriptions.

4. The system of claim 1, wherein the time series data further comprises seasonal or holiday data.

5. A computer-implemented method comprising:

receiving product information, wherein the product information comprises at least one of text or an image associated with a product;

determining a product type of the product based on the product information;

grouping product attribute groupings from the product information by clustering certain words of the product information that are determined to be associated with a feature of the determined product type, wherein clustering words of the product information is based at least in part on representations of words of the product information in a learned embedding space;

generating trend candidates by at least combining the determined product type with product attribute groupings, wherein the product attribute groupings are grouped by clustering certain words within the product information that are determined to be associated with a feature of the determined product type;

determining one or more trends, wherein the one or more trends are determined by:

submitting the trend candidates to a time series data service;

receiving, from the time series data service, time series data indicating popularity of each of the trend candidates as search criteria; and classifying a trend candidate as a trend by determining that the trend candidate has increased in popularity based on the time series data;

performing token level attention matching between the one or more trends and a plurality of products, wherein the token level attention matching identifies, based on a first token, a second token that scores above a threshold in probability of matching with the first token;

identifying one or more products that match the one or more trends by analyzing at least textual similarity between one or more words of a title of each of the one or more products and words within a trend based at least in part on the token level attention matching;

calculating, for each product of the identified one or more products, a score representing a combination of (i) relevance of the product to words within the trend and (ii) user activity with respect to the product; and presenting information regarding at least one of the identified one or more products to a computing device based at least in part on the score of each of the identified one or more products.

6. The computer-implemented method of claim 5, further comprising:

filtering the identified one or more products to exclude offensive products or products that do not meet a sales threshold; and presenting the identified one or more products in a user interface with an indication that the one or more products are associated with the trend.

7. The computer-implemented method of claim 5, further comprising:

filtering the identified one or more products to exclude products that do not meet a visual text similarity matching criteria.

8. The computer-implemented method of claim 7, wherein the visual text similarity matching criteria is performed by attempting to identify part of an image of the identified one or more products using words of the product title or description.

9. The computer-implemented method of claim 7, wherein the visual text similarity matching criteria is performed by attempting to identify part of an image of the identified one or more products using words of the trend.

10. The computer-implemented method of claim 5, wherein the trend is characterized as a fad, micro trend, or macro trend based at least in part on the time series data.

11. The computer-implemented method of claim 5, wherein the trend is determined by identifying linear growth of popularity of the time series data of one of the trend candidates.

12. The computer-implemented method of claim 5, wherein the trend is determined in part by identifying a seasonal component of the time series data of one of the trend candidates.

13. The computer-implemented method of claim 5, wherein the time series data further comprises seasonal or holiday data associated with popularity of a search term over multiple years.

14. The computer-implemented method of claim 5, wherein the product information is associated with a product identified via a social media service.

15. A non-transitory computer-readable medium storing specific computer-executable instructions that, when executed by a processor, cause the processor to at least:

receive product information, wherein the product information comprises at least one of text or an image associated with a product;

determine a product type of the product based on the product information;

group product attribute groupings from the product information by clustering certain words of the product information that are determined to be associated with a feature of the determined product type, wherein clustering words of the product information is based at least in part on representations of words of the product information in a learned embedding space;

generate trend candidates by at least combining the determined product type with product attribute groupings, wherein the product attribute groupings are grouped by clustering certain words within the product information that are determined to be associated with a feature of the determined product type;

determine one or more trends, wherein the one or more trends are determined by:

submitting the trend candidates to a time series data service;

receiving, from the time series data service, time series data indicating popularity of each of the trend candidates as search criteria; and classifying a trend candidate as a trend by determining that the trend candidate has increased in popularity based on the time series data;

perform token level attention matching between the one or more trends and a plurality of products, wherein the token level attention matching identifies, based on a first token, a second token that scores above a threshold in probability of matching with the first token;

identify one or more products that match the one or more trends by analyzing at least textual similarity between one or more words of a title of each of the one or more products and words within a trend based at least in part on the token level attention matching;

calculate, for each product of the identified one or more products, a score representing relevance of the product to words within the trend; and present information regarding at least one of the identified one or more products to a computing device based at least in part on the score of each of the identified one or more products.

16. The non-transitory computer-readable medium of claim 15, wherein the trend is determined by identifying linear growth of popularity of the time series data of one of the trend candidates.

17. The non-transitory computer-readable medium of claim 15, wherein the trend is characterized as a fad, micro trend, or macro trend based at least in part on the time series data.

18. The non-transitory computer-readable medium of claim 17, wherein the time series data further comprises seasonal or holiday data.

19. The non-transitory computer-readable medium of claim 17, wherein the trend is determined at least in part by identifying a seasonal component of the time series data of one of the trend candidates.

20. The non-transitory computer-readable medium of claim 15, wherein the product information is associated with a product identified in a news source.

* * * * *